United States Patent [19]

Noro et al.

[11] Patent Number: 5,894,206
[45] Date of Patent: Apr. 13, 1999

[54] ELECTRIC POWER STEERING APPARATUS

[75] Inventors: Yoshiki Noro; Yoshinobu Mukai, both of Wako, Japan

[73] Assignee: Honda Giken Kogyo Kabushiki Kaisha, Tokyo, Japan

[21] Appl. No.: 09/046,068

[22] Filed: Mar. 23, 1998

[30] Foreign Application Priority Data

Mar. 21, 1997 [JP] Japan ............ 9-067734

[51] Int. Cl.$^6$ ........................ B62D 5/04
[52] U.S. Cl. ............ 318/433; 318/489; 318/632; 388/930
[58] Field of Search ............ 318/432, 433, 318/434, 488, 489, 565, 566, 632; 388/909, 930; 180/400, 412, 443

[56] References Cited

U.S. PATENT DOCUMENTS

| | | | |
|---|---|---|---|
| 4,986,380 | 1/1991 | Morishita | 318/454 X |
| 5,600,559 | 2/1997 | Nishimoto et al. | 318/696 X |
| 5,652,487 | 7/1997 | Nishino et al. | 318/434 |
| 5,698,956 | 12/1997 | Nishino et al. | 318/432 |

*Primary Examiner*—Bentsu Ro
*Attorney, Agent, or Firm*—Merchant, Gould, Smith, Edell, Welter & Schmidt, P.A.

[57] ABSTRACT

An electric power steering apparatus includes a control unit for controlling a motor drive circuit which drives an electric motor on the basis of a steering torque signal supplied from a steering torque sensor. The control unit includes a center value compensating circuit for compensating for the offset of a center value of the steering torque sensor, and a direction inhibiting circuit for inhibiting supply of a motor control signal to the motor drive circuit on the basis of the steering torque signal. The direction inhibiting circuit has a reference value changing section for changing operation reference values in left and right directions of the steering torque in response to the offset of the center value. The reference value changing section generates left and right operation reference values corresponding to a center value signal supplied from the center value compensating circuit.

3 Claims, 9 Drawing Sheets

| CENTER VALUE $C_{OX}$ | | 2.3 V | 2.4 V | 2.5 V | 2.6 V | 2.7 V |
|---|---|---|---|---|---|---|
| LEFT VOLTAGE VALUE PATTERN | $V_{L1}$ | L | L | Z | L | Z |
| | $V_{L2}$ | L | Z | Z | Z | Z |
| | $V_{L3}$ | L | L | L | Z | Z |
| RIGHT VOLTAGE VALUE PATTERN | $V_{R1}$ | L | Z | L | L | Z |
| | $V_{R2}$ | L | Z | L | Z | Z |
| | $V_{R3}$ | L | L | Z | Z | Z |

L : GND (0V) LEVEL

Z : OPEN (IMPEDANCE IS INFINITE)

ELECTRIC POWER STEERING APPARATUS

BACKGROUND OF THE INVENTION

1. Field of the Invention

The present invention relates to an electric power steering apparatus which is capable of correcting operation reference values of a direction inhibiting circuit in response to the offset of a center value of the steering torque sensor.

2. Description of the Related Art

An electric power steering apparatuses having a steering torque sensor composed of a differential transformer is known in which a steering torque in the clockwise or counterclockwise direction produced during operation of a steering wheel is detected in the form of an electric differential output from the differential transformer such that intensity and polarity of the steering torque are represented by absolute value and polarity (±) of the differential output, respectively.

According to another known electric power steering apparatus, the steering torque sensor includes an operational amplifier driven by a single power supply of 5V with an imaginary ground of 2.5V. When the differential output from the differential transformer is 0 (steering torque is zero), the operational amplifier (steering torque sensor) generates a detection output of 2.5V. For the differential outputs of negative polarity (steering torques in the counterclockwise direction), the operational amplifier generates detection outputs in the range of 0 to 2.5V while for the differential outputs of positive polarity (steering torques in the clockwise direction), detection outputs in the range of 2.5 to 5.0V are generated from the operation amplifier.

Thus, the steering torque sensor has a neutral point indicative of a condition in which no steering torque is applied to the steering wheel (i.e., steering torque is 0), and the outputs of the operational amplifier have a center value of 2.5V.

When the output (center value) of the operational amplifier corresponding to the neutral point (steering torque=0) is varied either increasingly or decreasingly from 2.5V due to some reasons such as aging (or variation with time) of the differential transformer constituting the steering torque sensor, a center value compensating circuit is used to set the varied output (center value of, for example, 2.6V or 2.4V) as a new center value to thereby apply power assist to the left and right steerable front wheels in a balanced condition in response to steering torques applied to the steering wheel in the clockwise and counterclockwise directions.

An electric power steering apparatus having a direction inhibiting circuit is also known in which a direction signal contained in a motor control signal output from a control system for controllably driving an electric motor and a direction signal output from the direction inhibit circuit are judged for their agreement or matching, and when these direction signal do not match with each other, power assist by the electric motor in a direction opposite to the steering direction is inhibited.

The direction inhibit circuit has two operation reference values corresponding to detection outputs in the clockwise and counterclockwise directions, respectively, from the torque sensor. When the detection output in the clockwise direction exceeds the operation reference value in the counterclockwise direction, power assist by the electric motor in the counterclockwise direction is inhibited. Conversely, a detection output in the counterclockwise direction exceeding the operation reference value in the clockwise direction inhibits power assist by the electric motor in the clockwise direction. With this arrangement, when the direction signal produced from the direction inhibit circuit is not in match with the direction signal of the motor control signal output from the control system due to, for example, a trouble caused in a CPU (microprocessor) constituting the control system, power assist by the electric motor based on the motor control signal output from the control system is inhibited.

Since power assist by the electric motor acting in a direction opposite to the driver's intention, which may occur when the electric motor is driven to generate power assist in the counterclockwise direction in despite of the driver's actuation of the steering wheel in the clockwise direction, is inhibited, an unusual or strange behavior of the vehicle does not take place.

In the conventional electric power steering apparatus, adjustment of the center value (neutral point) of the steering torque sensor is performed either before or when the steering torque sensor is assembled in the vehicle. However, the adjustment is tedious and time-consuming because a mechanical adjustment process must be performed to find out the neutral point of the steering torque sensor (where the detection output from the steering torque sensor is 2.5V) before an input shaft of the steering shaft and a torsion bar are pinned together.

To deal with this problem, an electric adjustment process is developed and used in practice to electrically adjust the center value (neutral point) of the steering torque. According to the known electric adjustment process, an electronic control unit (ECU) having a memory storing therein preset possible values for the center value is used so that adjustment of the center value can be performed automatically by a microprocessor (CPU) incorporated in the ECU. With this electrical adjustment process, the center value adjustment is rendered simple and time-saving.

The electric adjustment process has a drawback, however, that since the operation reference value of the direction inhibiting circuit, which is provided to deal with uncontrollable running of the microprocessor (CPU), has a constant value such as 30 kg·cm. in steering torque for both the left and right directions, an offset of the center value greater than 10 kg·cm cannot be used in practice. To realize the center value offset less than 10 kg·cm, use of an expensive steering torque sensor is inevitable; if not so, setting of the center value will encounter a great difficulty incurring additional cost.

Figure 10:
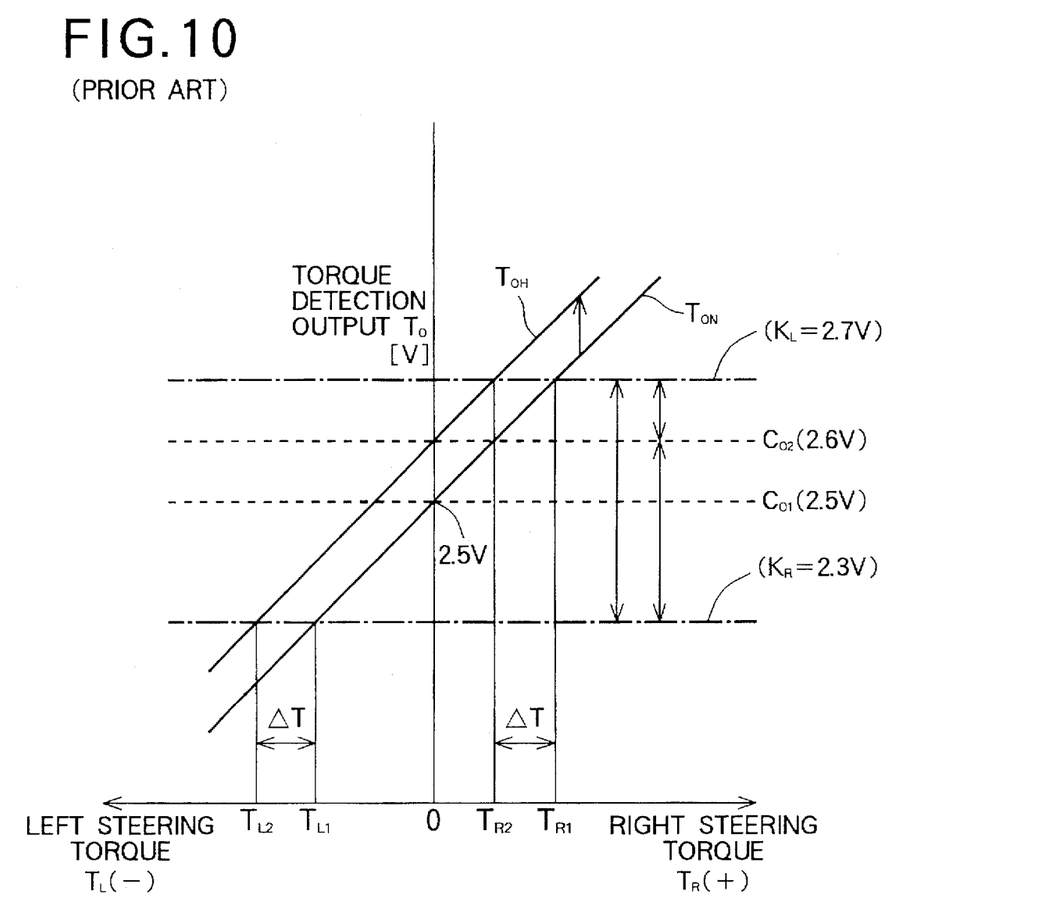
FIG. 10 is a table showing the relationship between the offset of the center value of the steering torque sensor and the detection output of the steering torque sensor.

FIG. 10 of the accompanying drawings is a table showing the relationship between the steering torque and the torque detection output taken with respect to the offset of the center value of the torque sensor incorporated in a conventional electric power steering apparatus.

As shown in FIG. 10, the torque center value (neutral point) $C_{O1}$, the left operation reference value $K_L$ for inhibiting power assist in the left direction of the direction inhibiting circuit, and the right operation reference value $K_R$ for inhibiting power assist of the right direction are set to be a nominal value of 2.5V, a value of 2.7V, and a value of 2.3V, respectively.

Under such conditions, the steering torque is zero (0) and the torque detection output $T_O$ is 2.5V which is equal to the center reference value $C_{O1}$. When the right steering torque (actuation of the steering wheel in clockwise direction) $T_R$ increases to $T_{R1}$, the torque detection signal $T_{ON}$ becomes equal to the left operation reference value $K_L$ (2.7V) of the direction inhibiting circuit with the result that power assist by the electric motor in the left direction corresponding to the actuation of the steering wheel in the counterclockwise direction is inhibited.

Conversely, when the left steering torque (actuation of the steering wheel in the counterclockwise direction) $T_L$ increases from zero (0) to $T_{L1}$, the torque detection output $T_{ON}$ becomes equal to the right operation reference value $K_R$ (2.3V) of the direction inhibiting circuit with the result that power assist by the electric motor in the right direction corresponding to the actuation of the steering wheel in the clockwise direction is inhibited.

Accordingly, in the case where a motor control signal tending to drive or rotate the electric motor in a direction opposite to the direction of a steering torque produced by actuating the steering wheel (a right steering torque $T_R$, for example) is output due to, for example, uncontrollable running of the microprocessor (CPU) in the control system which assists the electric motor on the basis of the torque detection output $T_O$, the direction inhibiting circuit inhibits power assist by the electric motor when the steering torque reaches the operation reference, value (the left operation reference value $K_L$, for example)

Since the right and left operation reference values $K_R$ and $K_L$ are set to be 2.7V and 2.3V, respectively, and since they $K_R$, $K_L$ have the same offset (0.2V) with respect to the center value $C_{O1}$ (2.5V), power assist by the electric motor is inhibited in a balanced or symmetrical condition with respect to steering torques ($T_{L1}$, $T_{R1}$, $|T_{L1}|=|T_{R1}|$) increasing in the left and right directions from the zero (0) steering torque point.

In the case where the center value (neutral point) of the steering torque sensor is varied from $C_{O1}$ (2.5V) to $C_{O2}$ (2.6V), torque detection outputs $T_O$ corresponding to the right steering torques $T_R$ and left steering torques $T_L$ are represented by the characteristic line $T_{OH}$. When the right steering torque $T_R$ becomes equal to $T_{R2}$ ($T_{R1}-\Delta T$), the torque detection output $T_{OH}$ reaches the left operation reference value $K_L$ (2.7V) whereupon the direction inhibiting circuit is activated to inhibit power assist by the electric motor in the left direction.

Also, when the left steering torque $T_L$ is $T_{L2}$ ($T_{L1}+\Delta T$), the torque detection output $T_{OH}$ becomes equal to the right operation reference value $K_R$ (2.3) whereupon the direction inhibit circuit is activated to inhibit power assist by the electric motor in the right direction.

As is apparent from FIG. 10, the left operation reference value $K_L$ (2.7V) in the direction inhibit circuit is reached when the right steering torque $T_R$ is $T_{R2}$ ($T_{R1}-\Delta T$), whereas the right operation reference value $K_R$ (2.3V) in the direction inhibit circuit is not reached until when the left steering torque $T_L$ becomes equal to $T_{L2}$ ($T_{L1}+\Delta T$). Since $T_{L1}$ and $T_{R1}$ have the same absolute value ($|T_{L1}|=|T_{R1}|$), the absolute value of $T_{L2}$ is greater than the absolute value of $T_{R2}$ by $2\Delta T$. As a result, left and right steering torques ($T_L$, $T_R$) at which the direction inhibiting circuit is activated are in an ill-balanced condition.

If two microprocessors (CPUs) are used to formed the direction inhibiting circuit, a great offset of the center value such as 10 kg·cm or more becomes available by the use of software processing Use of the two microprocessors can lower the cost of the steering torque sensor but increases the cost of the direction inhibiting circuit.

SUMMARY OF THE INVENTION

With the foregoing drawbacks in view, it is an object of the present invention to provide an electric power steering apparatus which is capable of changing operation reference values of a direction inhibiting circuit in response to variations or offsets of the center value of a steering torque sensor, thereby securing easy adjustment of the center value of the steering torque sensor and improved direction inhibiting performance.

According to the present invention, there is provided an electric power steering apparatus which comprises: an electric motor for providing an assist torque to a steering system; a steering torque sensor for detecting a steering torque of the steering system and generating a steering torque signal indicative of the detected steering torque; a control unit including a target current signal setting device for generating a target current signal on the basis of the steering torque signal, and a motor control circuit for generating a motor control signal on the basis of the target current signal; and a motor drive circuit for driving the electric motor on the basis of the motor control signal. The control unit further includes a center value compensating circuit for compensating for the offset of a center value of the steering torque sensor, and a direction inhibiting circuit for inhibiting, on the basis of the steering torque signal, the motor control signal from being supplied to the motor drive circuit. The direction inhibiting circuit has a reference value changing section for changing operation reference values in left and right directions of the steering torque in response to the offset of the center value.

Because the reference value changing section incorporated in the direction inhibiting circuit changes the operation reference values in the left and right directions in response to the offset of the center value, it becomes possible to compensate for variations of the operating point where power assist by the electric motor in response to a steering torque in either direction when the center value is varied. The operating point for inhibiting power assist of the electric motor can always tie balanced with respect the steering torques in the left and right directions.

The reference value changing section may include a left voltage pattern setting device having a plurality of left voltage value patterns set in advance for the center value so as to generate one of the left voltage value patterns corresponding to the offset center value, and a right voltage pattern setting device having a plurality of right voltage value patterns set in advance for generating one of the right voltage value patterns corresponding to the offset center value.

As an alternative, the reference value changing section may include a left operation reference value changing device having a plurality of left operation reference values stored in advance for the center value so as to generate one of the left operation reference values corresponding to the offset center value, and a right operation reference value changing device having a plurality of right operation reference values stored in advance for the center value so as to generate one of the right operation reference values corresponding to the offset center value.

The above and other objects, features and advantages of the present invention will become manifest to these versed in the art upon making reference to the detailed description and the accompanying sheets of drawings in which a preferred structural embodiment incorporating the principles of the invention is shown by way of illustrative examples.

DETAILED DESCRIPTION OF THE PREFERRED EMBODIMENT

One preferred structural embodiment of the present invention will be described below in greater detail with reference to the accompanying drawings, wherein like reference characters designate like or corresponding parts throughout several views.

Figure 1:
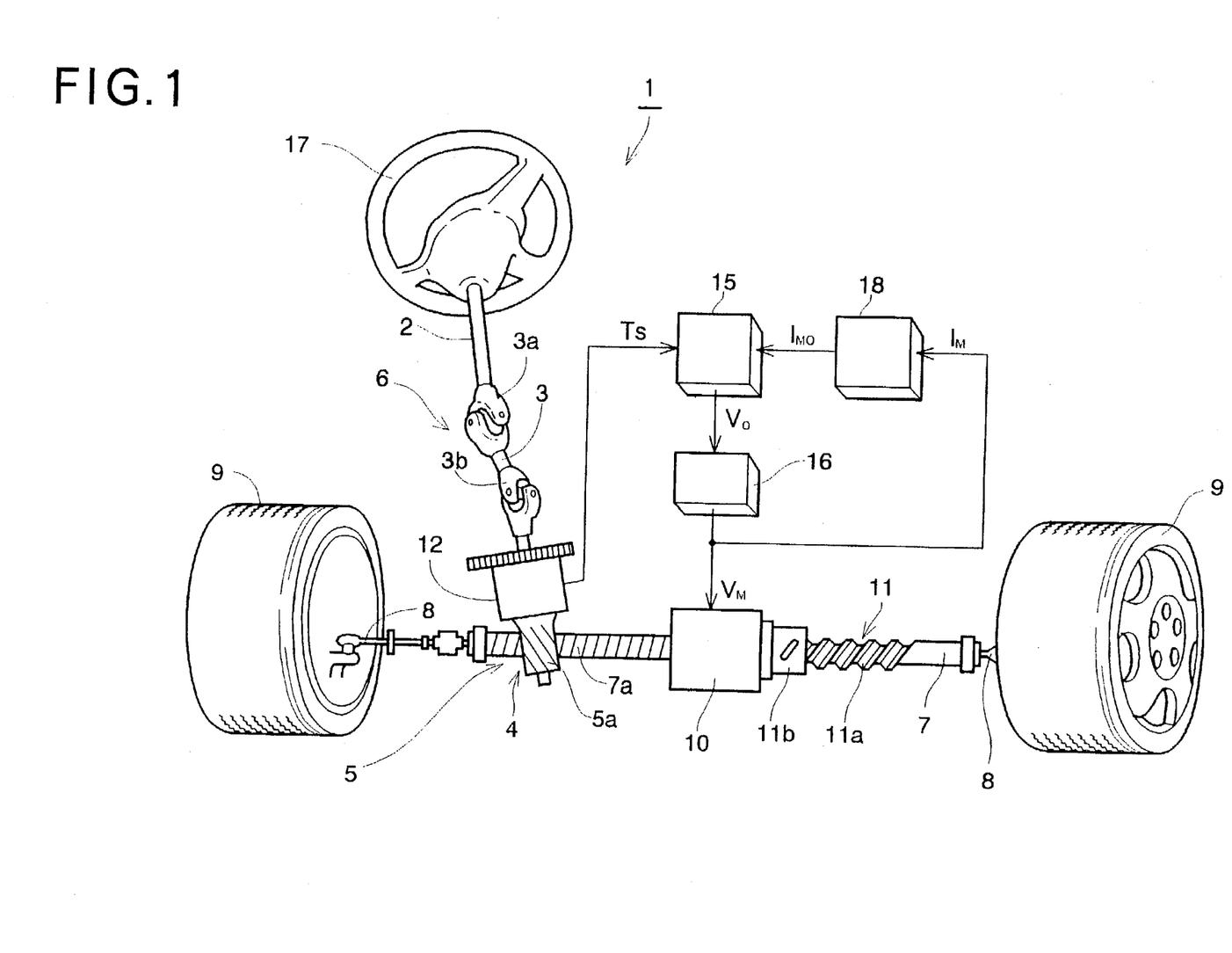
FIG. 1 is a diagrammatical view showing the general construction of an electric power steering apparatus according to the present invention pertains.

FIG. 1 diagrammatically shows the general construction of an electric power steering apparatus 1 embodying the present invention. The electric power steering apparatus 1 comprises a manual steering power generation unit or mechanism 6, which includes a steering shaft 2 that is integrally connected at one end to a steering wheel 17 and at the other end to a pinion 5a of a rack-and-pinion mechanism 5 via a connecting shaft 3 having universal joints 3a, 3b mounted on opposite ends thereof. The rack-and-pinion mechanism 5 is received in a steering gear box 4, and the pinion 5a is in mesh with a rack 7 which is a long bar with teeth 7a cut into one side. The rack-and-pinion mechanism 5 translates a rotary motion of the pinion 5a into an axial reciprocating motion of the rack 7. Opposite ends of the rack 7 are connected via tie rods 8 to left and right steerable front wheels 9.

When the steering wheel 17 is manually turned or rotated in a desired direction, the rack-and-pinion-based manual steering power generation unit 6 operates to pivot the front wheels 9 in the same direction, thereby changing the direction of movement of a motor vehicle.

In order to reduce the amount of manual steering power that has to be produced by the manual steering power generation unit 6, an electric motor 10 is disposed in concentric relation to the rack 7 and supplies a steering assist (steering assist torque) to the rack 7 via a ball screw mechanism 11. The ball screw mechanism 11 is assembled with the rack 7 so that rotational power of the electric motor 10 is converted by the ball screw mechanism 11 into an axial thrusting force acting on the rack 7. The ball screw mechanism 11 has a known structure and includes a screw shaft 11a threaded over a longitudinal portion of the rack 7, and a nut 11b secured to an output shaft of the electric motor 10 and threaded around the screw shaft 11a with balls (not shown) disposed therebetween.

A steering torque sensor 12 is contained in the steering gear box 4 and detects a direction and intensity of manual steering power applied by the vehicle driver. A steering torque signal (in the form of an analog electric signal) $T_S$ indicative of the steering torque detected by the steering torque sensor 12 is supplied to a control unit 15 which will be described below in detail.

The control unit 15 essentially comprises a microprocessor including various arithmetic and logic units, processors, signal generators, memories, and the like. The control unit 15 generates a motor control signal $V_O$ (a combination of an ON signal and a PWM signal, for example) corresponding to the steering torque signal $T_S$ so as to controllably drive a motor drive circuit 16.

The control unit 15 also includes a center value compensating section or circuit 21 (FIG. 2) in which when a torque center value is varied or offset on the basis of the steering torque signal $T_S$ supplied from the steering torque sensor 12, the varied or offset torque center value is detected as a new torque center value.

The control unit 15 further includes a direction inhibiting circuit 25 (FIG. 3) in which when the torque center value is offset, operation reference values for controlling operation of the directional inhibiting circuit 25 are changed in response to the new torque center value.

Figure 6:
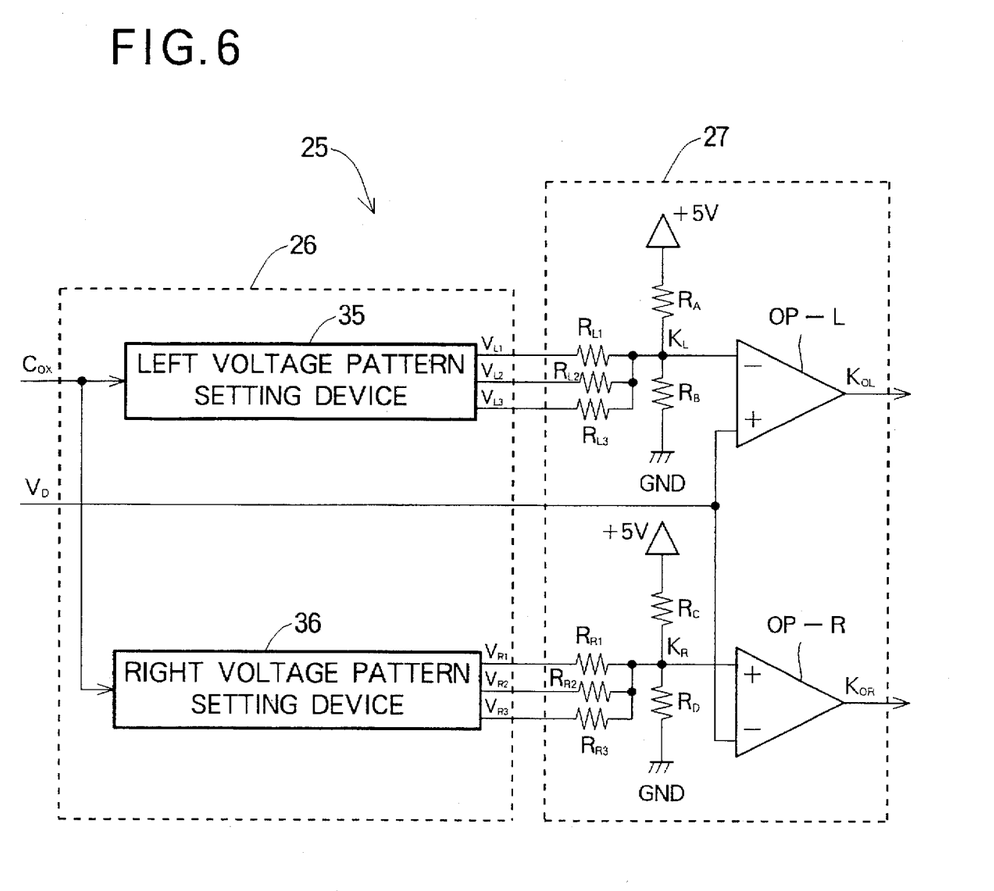
FIG. 6 is a block diagram showing a direction inhibiting circuit arranged to generate a plurality of voltage value patterns.

The motor drive circuit 16 comprises a bridge circuit composed of, for example, four switching devices such as power FETs (Field-Effect Transistors) Q1–Q4, as shown in FIG. 6, and generates a motor voltage $V_M$ for driving one pair of the two diagonally opposed power FETs by PWM (Pulse-Width Modulation) and ON signals to thereby drive the electric motor 10.

The motor current detector 18 detects a motor current $I_M$ actually flowing in the electric motor 10 and generates a motor current signal $I_{MO}$ corresponding to the detected motor current $I_M$. The motor current signal $I_{MO}$ is fed back to the control unit 15 (negative feedback).

Figure 2:
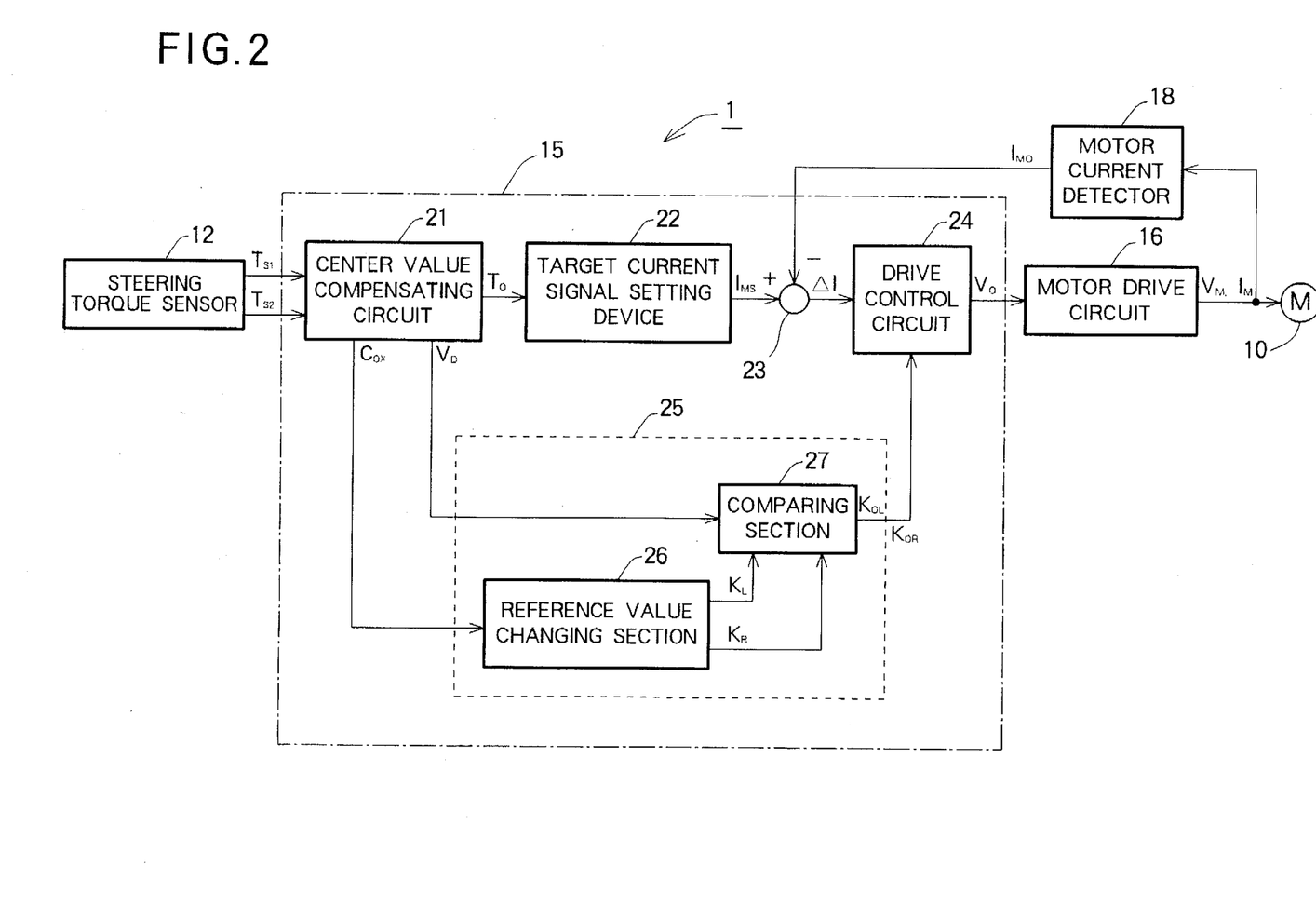
FIG. 2 is a block diagram showing an electric arrangement of the electric power steering apparatus.

FIG. 2 shows in block diagram principal parts of the electric power steering apparatus 1. As shown in this figure, the control unit 15 of the electric power steering apparatus 1 includes the center value compensating circuit 21, a target current signal setting device 22, an offset calculating device 23, a drive control circuit 24, and the direction inhibiting circuit 25.

The center value compensating circuit 21 outputs steering torques in clockwise and counterclockwise directions as a torque detection signal $T_O$ of a value of voltage assuming a single polarity on the basis of electric steering torque signal $T_{S1}$, $T_{S2}$ supplied from the steering torque sensor 12.

The center value compensating circuit 21 further stores a center value (nominal value of 2.5V) and outputs the torque detection signal $T_O$ of an intensity variable abut a center represented by the center value. Moreover, when the center value is offset due to some reasons, the center value compensating circuit 21 stores the offset center value as a new center value and outputs, after undertaking compensation of the new center value in such EL manner as to be the nominal value of 2.5V for outputting the torque detection signal $T_O$.

Figure 3:
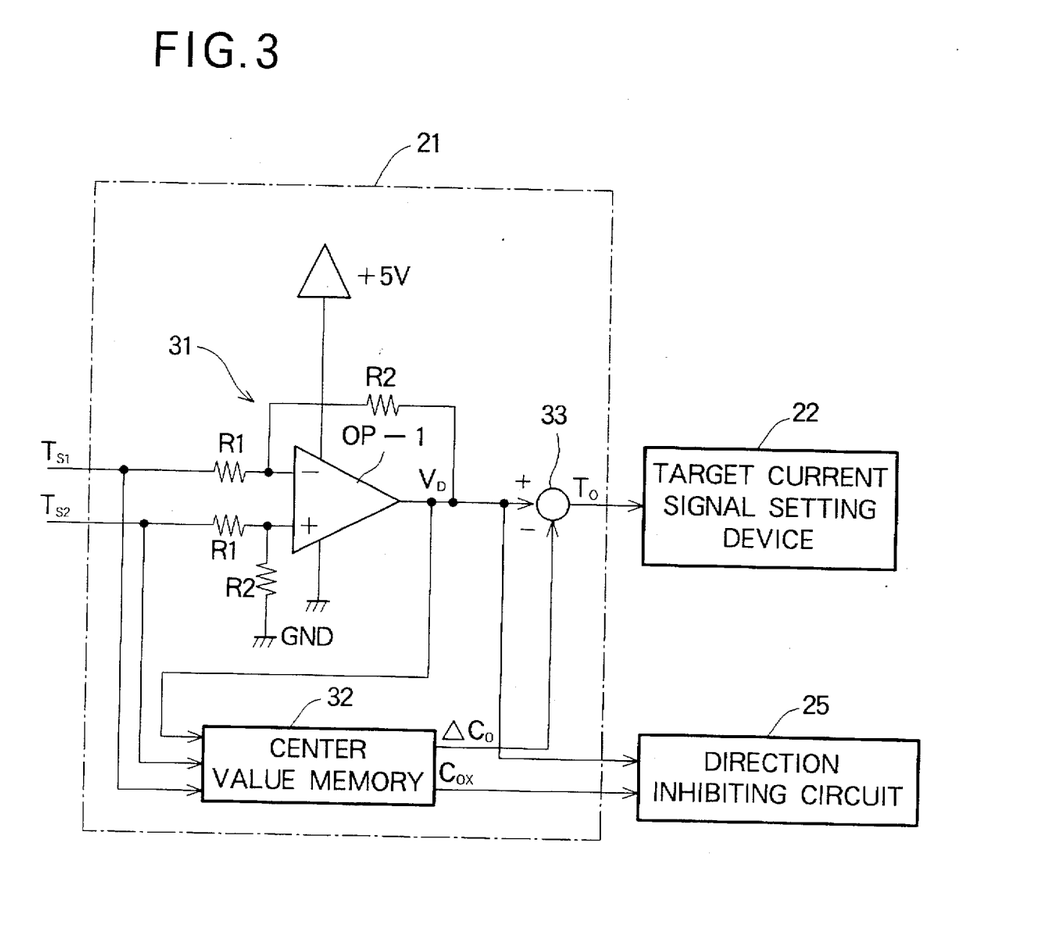
FIG. 3 is a block diagram showing a center value compensating circuit of the electric power steering apparatus shown in FIG. 2.

As shown in FIG. 3, the center value compensating circuit 21 includes a converter 31, a center value memory 32 and a subtractor 33.

The converter 31 comprises a differential amplifier OP-1 driven by a single power supply (of a constant voltage of 5V, for example, with an imaginary ground of 2.5V). The differential amplifier OP-1 amplifies a differential input ($T_{S1}$–$T_{S2}$) between the steering torque signals $T_{S1}$, $T_{S2}$ supplied from the steering torque sensor 12 (FIG. 2). The differential amplifier OP-1 generates an output $V_D$ below 2.5V (center value) when the differential input assumes a negative polarity while an output $V_D$ above 2.5V when the differential input assumes a positive polarity. The output $V_D$ is supplied to the center value memory 32, the subtractor 33, and the direction inhibiting circuit 25.

The center value memory 32 comprises a rewritable nonvolatile memory such as an EEPROM, and subtractors. When the steering torque signals $T_{S1}$ and $T_{S2}$ are zero (the steering wheel is in a neutral position), the center value memory 32 stores the output $V_D$ (having a nominal value of 2.5V) from the converter 31 as a center value $C_{O1}$ (see FIG. 10) and then calculates an offset $\Delta C_O$ ($C_{O1}$–2.5V) between the center value $C_{O1}$ and the nominal value of 2.5V for supplying the offset $\Delta C_O$ to the subtractor 33. The center value $C_{O1}$ is supplied to the direction inhibiting circuit 25 in the form of a center value signal $C_{OX}$.

When the center value $C_{O1}$ (nominal value of 2.5V) is offset to assume a central value $C_{O2}$ such as 2.6V (see FIG. 10), the center value memory 32 stores the offset central value $C_{O2}$ as a new center value $C_{OX}$. Thereafter, the center value memory 32 calculates an offset $\Delta C_O$ ($C_{O2}$–2.5V) between the center value $C_{O2}$ and the nominal value of 2.5V for supplying the offset $\Delta C_O$ to the subtractor 33. The center value $C_{O2}$ is supplied to the direction inhibiting circuit 25 in the form of a center value signal $C_{OX}$.

The subtractor 33 calculates an offset ($V_D$–$\Delta C_O$) between the output $V_D$ and the center value offset signal $\Delta C_O$ supplied from the converter 31 and the center value memory 32, respectively, and then supplies the calculated offset to the target current signal setting device 22 in the form of the afore-mentioned torque detection signal $T_O$.

Thus, the center value compensating circuit 21 outputs the offset ($V_D$–$\Delta C_O$) between the output $V_D$ and the center value offset signal $\Delta C_O$ supplied from the converter 31 and the center value memory 32, respectively, in the form of the torque detection signal $T_O$ with the result that the torque detection signal $T_O$ can always be set to the nominal value of 2.5V by undertaking compensation of the varied center value even when the center value of the steering torque sensor 12 (FIG. 2) is varied.

The target current signal setting device 22 comprises a memory such as a ROM (Read-Only Memory) and stores therein various data about a target current signal $I_{MS}$ corresponding to various possible values of torque detection signals $T_O$ predetermined by experiments or through theoretical consideration. Upon receipt of a torque detection signal $T_O$ from the center value compensating circuit 21, the target current signal setting device 22 retrieves a data piece of target current signal $I_{MS}$ corresponding to the received torque detection signal $T_O$ and then supplies the target current signal $I_{MS}$ to the offset calculating device 23.

Figure 4:
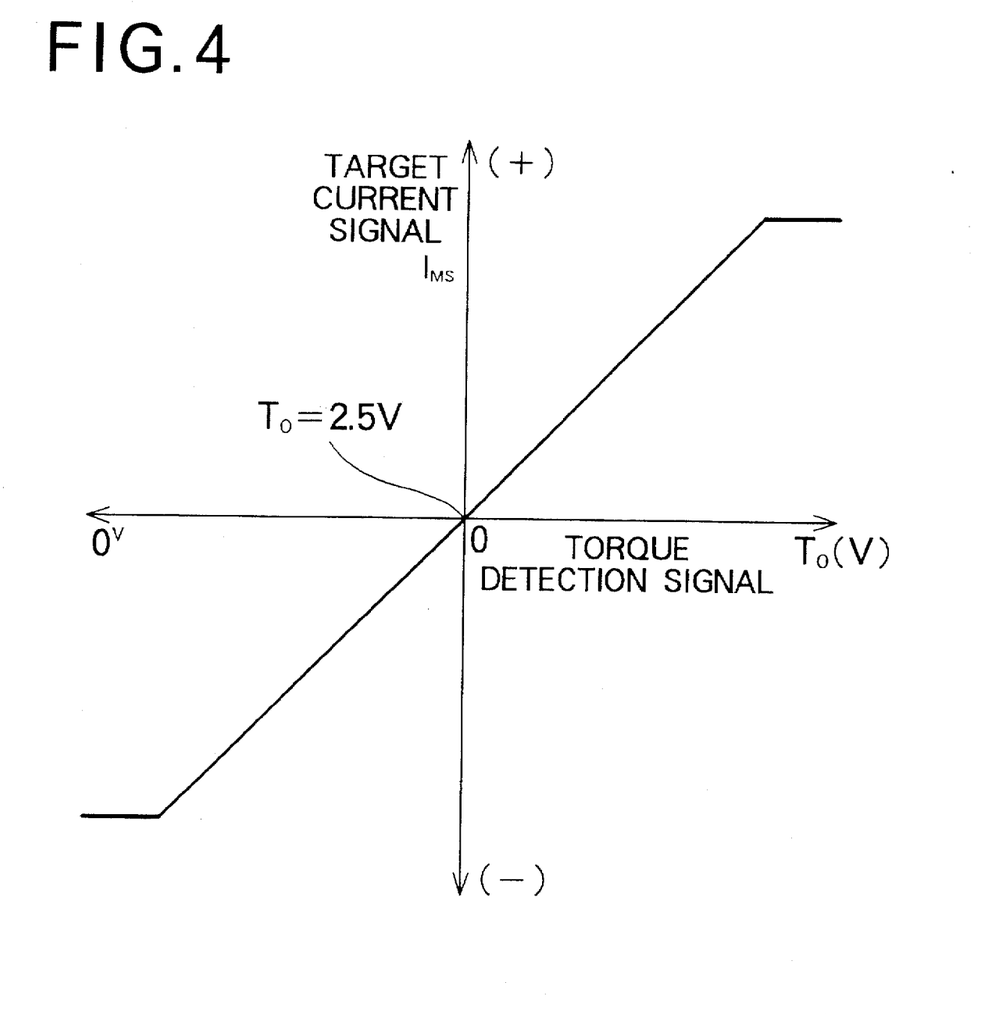
FIG. 4 is a graph showing a torque detection signal versus target current signal characteristic curve.

As shown in FIG. 4, the target current signal $I_{MS}$ is to be zero (0) when the torque detection signal $T_O$ is 2.5V ($T_O$=2.5V). When the torque detection signal $T_O$ exceeds 2.5V, the target current signal $I_{MS}$ assumes the positive polarity (+). The torque detection signal $T_O$ below 2.5V produces the target current signal $I_{MS}$ assuming the negative polarity (–).

The offset calculating device 23 shown in FIG. 2 has the function of a subtractor established by software control. The offset calculating device 23 calculates an offset $\Delta I$ ($I_{MS}$–$I_{MO}$) between the target current signal $I_{MS}$ and the motor current signal $I_{MO}$ supplied from the target current setting device 22 and the motor current detector 18, respectively, and thereafter supplies the offset to the drive control circuit 24 in the form of an offset signal $\Delta I$.

The drive control circuit 24 comprises a PID controller, a PWM signal generator, and a logic circuit and generates a motor control signal $V_O$ composed of a PWM signal $V_{PWM}$, an ON signal $V_{ON}$, and an OFF signal $V_{OF}$ each of which corresponds to intensity and polarity of the offset signal $\Delta I$ supplied from the offset calculating device 23 after PID (proportional plus integral plus derivative) control performed on the offset signal $\Delta I$.

The drive control circuit 24 supplies the motor control signal $V_O$ composed of the PWM signal $V_{PWM}$, the ON signal $V_{ON}$ and the OFF signal $V_{OF}$ to the logic circuit, which in turn controls to gate or inhibit transmission of the motor control signal $V_O$ in accordance with logic levels of direction inhibiting signals $K_{OL}$, $K_{OR}$ supplied from the direction inhibiting circuit 25.

Figure 5A:
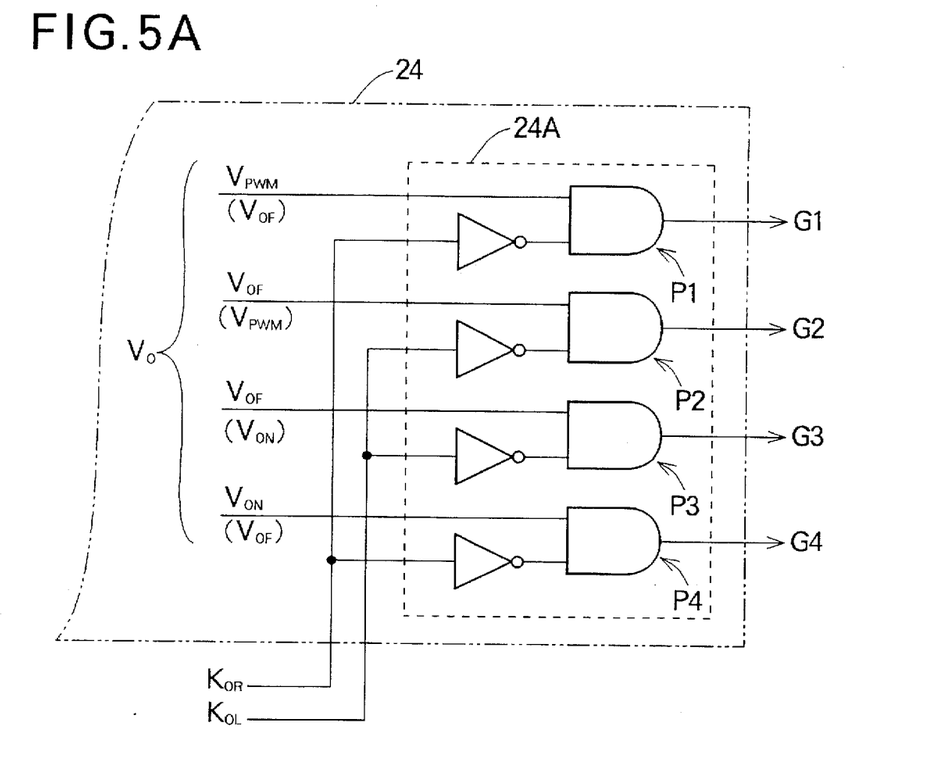
FIG. 5A is a circuit diagram showing a logic circuit forming a drive control circuit of the electric power steering apparatus shown in FIG. 2.

One example of the logic circuit contained in the drive control circuit 24 is shown in FIG. 5A. As shown in FIG. 5A, the logic circuit 24A includes logic devices P1, P2, P3 and P4 each composed of an inverter and an AND circuit or gate.

Assuming that the steering wheel is turned in the clockwise direction, each of the PWM signal $V_{PWM}$, the OFF signal $V_{OF}$, the OFF signal $V_{OF}$ and the ON signal $V_{ON}$ of the motor control signal $V_O$ is input to one input terminal of the respective AND gates of the logic devices P1–P4. When both of the left and right direction inhibiting signals $K_{OL}$, $K_{OR}$ are at low (L) levels, the input signals $V_{PWM}$, $V_{OF}$, $V_{OF}$ and $V_{ON}$ are output from the logic devices P1–P4 and then supplied to, for example, gates G1 through G4 of the power FETs Q1 through Q4, respectively, constituting the motor drive circuit 16 as shown in FIG. 5B.

Figure 5B:
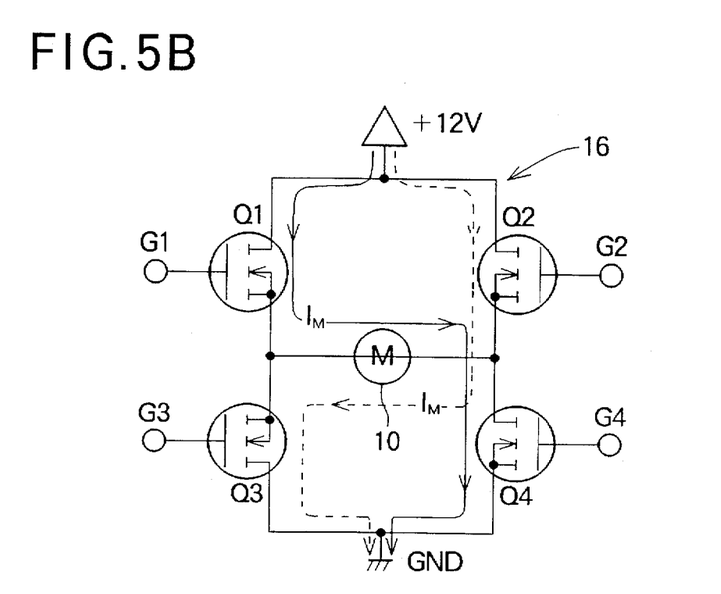
FIG. 5B is a circuit diagram showing a motor drive circuit of the electric power steering apparatus shown in FIG. 2.

As shown in FIG. 5B, by supplying the signals to the gates G1 through G4, the power FETs Q1 and Q4 are driven and turned on by the PWM and ON signals $V_{PWM}$ and $V_{ON}$, respectively, while the power FETs Q2 and Q3 are turned off by the OFF signals $V_{OF}$. Thus, the motor current $I_M$ flows along a path which starts from a power supply (12V), then passes successively through the power FET Q1, the electric motor 10 and the power FET Q4, and finally ends with the ground GND, as indicated by the solid-lined arrows. As a result, the electric motor 10 is rotated, for example, in the forward direction, to thereby provide power assist to the vehicle in making a right turn.

On the other hand, assuming that the steering wheel is turned in the counterclockwise direction, each of the OFF signal $V_{OF}$, the PWM signal $V_{PWM}$, the ON signal $V_{ON}$ and the OFF signal $V_{OF}$ of the motor control signal $V_O$ is input to the one input terminal of the respective AND gates of the logic devices P1–P4. When both of the left and right direction inhibit signals $K_{OL}$, $K_{OR}$ are at L levels, the input signals $V_{OF}$, $V_{PWM}$, $V_{ON}$ and $V_{OF}$ are output from the logic devices P1–P4 and supplied to the gates G1 through G4 of the power FETs Q1 through Q4, respectively, as shown in FIG. 5B.

By supplying the signals, the gates G1–G4, the power FETs Q1 and Q4 are turned off by the OFF signals $V_{OF}$ while the power FETs Q2 and Q3 are driven and turned on by the PWM and ON signals $V_{PWM}$ and $V_{ON}$. Thus, the motor current $I_M$ flows along a path which starts from the power supply (12V), then passes successively through the power FET Q2, the electric motor 10 and the power FET Q3, and finally ends with the ground GND, as indicated by the broken-lined arrows in FIG. 5B. As a result, the electric motor 10 is rotated in the reverse direction to thereby provide power assist to the vehicle in making a left turn.

If the microprocessor in the control system operates properly, each of the PWM signal $V_{PWM}$, the OFF signal $V_{OF}$, the OFF signal $V_{OF}$ and the ON signal $V_{ON}$ is input to one input terminal of the respective AND gates of the logic devices P1–P4, as stated above, when the steering wheel is turned in the clockwise direction. However, even when a trouble is caused in the microprocessor of the control system due to some reasons and then each of the OFF signal $V_{OF}$, the PWM signal $V_{PWM}$, the ON signal $V_{ON}$ and the OFF signal $V_{OF}$ is input to the one input terminal of the respective AND gates of the logic devices P1–P4 to thereby output the motor control signal $V_O$ as if the steering wheel were turned in the counterclockwise direction, by taking the steering action to cause the clockwise turn, the output $V_O$ reaches a left operating reference value $K_L$ (FIG. 2) whereupon the left direction inhibiting signal $K_{OL}$ goes up to a high (H) level to thereby inhibit the logic devices P2 and P3 from outputting or gating the signals with the result that the power FETs Q2 and Q3 are inhibited from being driven.

As shown in FIG. 2, the direction inhibiting circuit 25 includes a reference value changing section 26 and a comparing section 27. The direction inhibiting circuit 25 varies left and right operating reference values $K_L$, $K_R$ in response to the center value signal $C_{OX}$ supplied from the center value compensating circuit 21. In the case where the output $V_D$ supplied from the center value compensating circuit 25 reaches the varied or offset left and right operating reference values $K_L$, $K_R$, the direction inhibiting circuit 25 supplies the left and right direction inhibiting signals $K_{OL}$, $K_{OR}$ to the logic circuit 24A of the drive control circuit 24 shown in FIG. 5A. As a result, the respective motor control signals $V_O$, which are output from the drive control circuit 24, for turning the vehicle in the left and right directions are inhibited from being output to the motor drive circuit 16 by the direction inhibiting circuit 25.

The comparing section 27 includes two operational amplifiers (described later) each for comparing the output $V_D$ supplied from the center value compensating circuit 21 with the left or right operating reference value $K_L$ or $K_R$ supplied from the reference value changing section 26. When the output $V_D$ reaches the left or right operating reference value $K_L$ or $K_R$ ($V_D=K_L$ or $V_D=K_R$), the left or right direction inhibiting signal $K_{OL}$ or $K_{OR}$ is supplied to the drive control circuit 24 by the comparing section 27.

FIG. 6 shows in block diagram the direction inhibiting circuit 25 of the present invention which generates a plurality of voltage value patterns. As shown in this figure, the direction inhibiting circuit 25 is composed of the reference value changing section 26 and the comparing section 27.

The reference value changing section 26 includes a left voltage pattern setting device 35 and a right voltage pattern setting device 36. Each of the left and right voltage pattern setting devices 35, 36 is composed of a memory such as a ROM and has three output terminals. The left and right voltage pattern setting devices 35, 36 have therein preset left voltage value patterns $V_{L1}$, $V_{L2}$, $V_{L3}$ and right voltage value patterns $V_{R1}$, $V_{R2}$, $V_{R3}$, respectively, which correspond to the center value signal $C_{OX}$. Upon supply of the center value signal $C_{OX}$ from the center value compensating circuit 21 (FIG. 2), the corresponding left and right voltage value patterns $V_{L1}$, $V_{L2}$, $V_{L3}$ and $V_{R1}$, $V_{R2}$, $V_{R3}$ are generated by the reference value changing section 26.

The comparing section 27 is a comparator having two operational amplifiers OP-L and OP-R, and three input terminals so arranged as to correspond to the respective operational amplifiers OP-L and OP-R.

The operational amplifier OP-L includes three input resistances set to have resistance values $R_{L1}$, $R_{L2}$, $R_{L3}$ while the operational amplifier OP-R includes three input resistances set to have resistance value $R_{R1}$, $R_{R2}$, $R_{R3}$.

Figure 7:
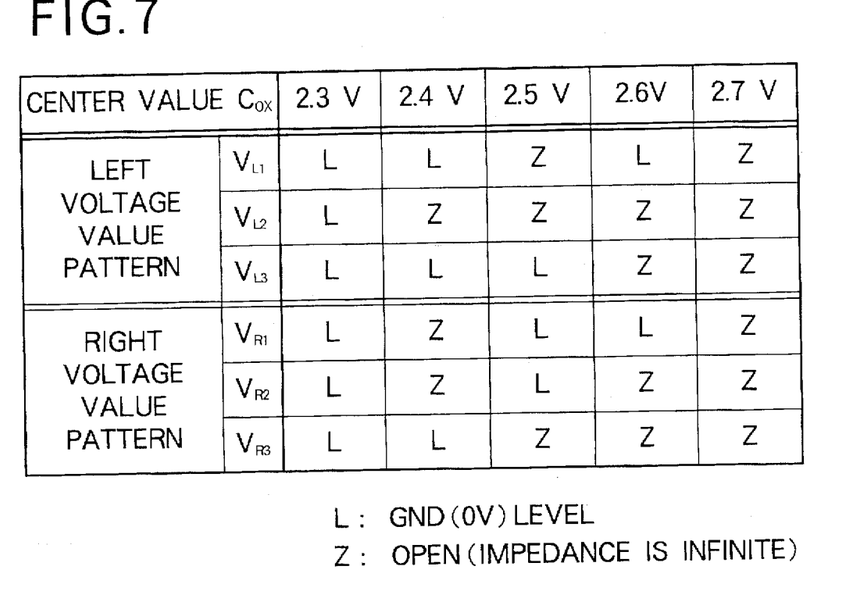
FIG. 7 is a table showing the relation between left and right voltage value patters and the center values.

Reference is had to FIG. 7 which is a table showing the left and right voltage patterns $R_{L1}$, $R_{L2}$, $R_{L3}$ and $R_{R1}$, $R_{R2}$, $R_{R3}$, all of which correspond to the center value $C_{OX}$.

When the center value $C_{OX}$ is 2.5V, by setting the left voltage value patterns $V_{L1}$, $V_{L2}$, $V_{L3}$, which are output from the left voltage pattern setting device 35 (FIG. 6), to Z, Z, L, respectively, the left operating reference value $K_L$ shown in FIG. 6 is set to have a value of 2.7V obtained by dividing a voltage of 5V in a resistance ratio of a resistance value $R_L$ to a parallel value of resistance values $R_A$, $R_B$ and $R_{R3}$ (parallel composite resistance $R_L$: $(1/R_L)=(1/R_B)+(1/R_{L3})$).

Similarly, when the center value $C_{OX}$ is 2.5V, by setting the right voltage value patterns $V_{R1}$, $V_{R2}$, $V_{R3}$, which are output from the right voltage pattern setting device 36 (FIG. 6), to L, L, Z, respectively, the right operating reference value $K_R$ shown in FIG. 6 is set to have a value of 2.3V obtained by dividing the voltage 5V in a resistance ratio of a resistance value RC to a parallel value of resistance values $R_D$, $R_{R1}$ and $R_{R2}$ (parallel composite resistance $R_R$: $(1/R_R)=(1/R_D)+(1/R_{R1})+(1/R_{R2})$).

In the case where the center value $C_{OX}$ increases or decreases from 2.5V, the left and right voltage pattern setting devices 35, 36 output $V_{L1}$ to $V_{L3}$ and $V_{R1}$ to $V_{R3}$, respectively, as shown in FIG. 7. It will be appreciated that the left operating reference value $K_L$ and the right operating reference value $K_R$ are set in response to variations or offsets of the center value $C_{OX}$.

In FIG. 6, the comparing section 27 compares the output $V_O$ supplied from the center value compensating circuit 21 with the left and right operating reference values $K_L$ and $K_R$. When the output $V_D$ is greater than or equal to the left operating reference value $K_L$ ($V_D \geq K_L$), or otherwise the output $V_D$ is less than or equal to the right operating reference value $K_R$ ($V_D \leq K_R$), the comparing section 27 supplies a high (H) level left direction inhibiting signal $K_{OL}$, or a high (H) level right direction inhibiting signal $K_{OR}$ to the drive control circuit 24 (FIG. 2), respectively.

Figure 8:
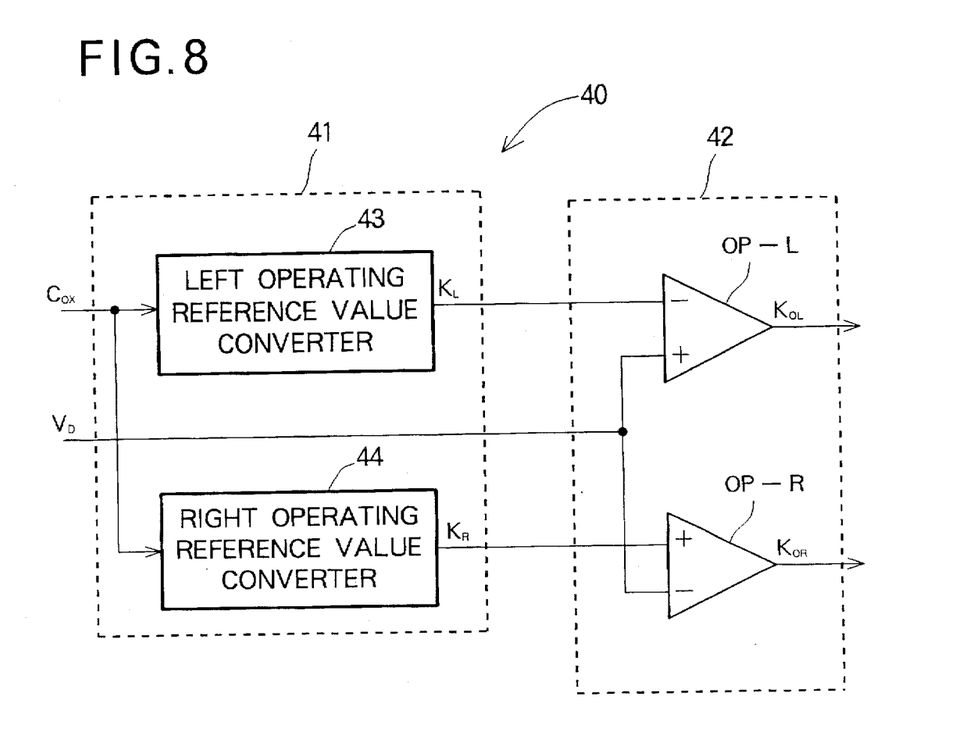
FIG. 8 is a block diagram showing a direction inhibiting circuit arranged to generate operation reference values.

FIG. 8 shows in block diagram a modified form of the direction inhibiting circuit arranged to generate plural reference values. As shown in this figure, the modified direction inhibiting circuit 40 includes a reference value changing section 41 and a comparing section 42.

The reference value changing section 41 has a left operating reference value converter 43 and a right operating reference value converter 44. The left and right operating reference value converters 43, 44 are composed of memories such as ROMs and prestore therein the left operating reference value $K_L$ and the right operating reference value $K_R$, respectively, which correspond to the center value signal $C_{OX}$. Upon receipt of the center value signal $C_{OX}$ supplied from the center value compensating circuit (FIG. 2), the reference value changing section 41 reads out the left operating reference value $K_L$ and the right operating reference value $K_R$ corresponding to the center value signal $C_{OX}$ for sending the values $K_L$ and $K_R$ to the comparing section 42.

The left operating reference value $K_L$ and the right operating reference value $K_R$ are so set as to increase or decrease with the same increment or decrement in the same direction as the varied center value signal $C_{OX}$. For example, when the center value $C_{OX}$ is increasingly varied from 2.5V to 2.6V, the left operating reference value $K_L$ varies from 2.7V to 2.8V while the right operating reference value $K_R$ is varied from 2.3V to 2.4V. On the other hand, when the center value $C_{OX}$ is decreasingly varied from 2.5V to 2.4V, the left operating reference value $K_L$ varies from 2.7V to 2.6V while the right operating reference value $K_R$ is varied from 2.3V to 2.2V.

The comparing section 42 has two operators OP-L and OP-R each composed of an operational amplifier. The comparator OP-L receives the left operating reference value $K_L$ at a negative terminal thereof while output $V_D$ from the center value compensating circuit 21 (FIG. 2) at a positive terminal thereof. The comparator OP-R receives the right operating reference value $K_R$ at a positive terminal thereof while the output $V_D$ from the center value compensating circuit 21 at a negative terminal thereof.

The comparing section 42 supplies a low (L) level left direction inhibiting signal $K_{OL}$ to the drive control circuit 24 (FIG. 2) when the output $V_D$ is less than the left operating reference value $K_L$ ($V_D<K_L$) while a high (H) level left direction inhibiting signal $K_{OL}$ to the drive control circuit 24 when the output $V_D$ is greater than or equal to the left operating reference value $K_L$ ($V_D \geq K_L$).

Also, the comparing section 42 supplies a low (L) level right direction inhibiting signal $K_{OR}$ to the drive control circuit 24 (FIG. 2) when the output $V_D$ is greater than the right operating reference value $K_R$ ($V_D>K_R$) while a high (H) level right direction inhibiting signal $K_{OR}$ to the drive control circuit 24 when the output $V_D$ is less than or equal to the right operating reference value $K_R$ ($V_D \leq K_R$).

When the L level left direction inhibiting signal $K_{OL}$ is supplied to the logic circuit 24A (FIG. 5), the motor control signal $V_O$ is supplied to the gates G2 and G3 of the motor drive control circuit 16. Conversely, when the H level left direction inhibiting signal $K_{OL}$ is supplied to the logic circuit 24A, the motor control signal $V_O$ is inhibited from being supplied to the gates G2 and G3 of the motor drive circuit 16.

Similarly, when the L level right direction inhibiting signal $K_{OR}$ is supplied to the logic circuit 24A (FIG. 5), the motor control signal $V_O$ is supplied to the gates G1 and G4 of the motor drive control circuit 16 while when the H level right direction inhibiting signal $K_{OR}$ is supplied to the logic circuit 24A, the motor control signal $V_O$ is inhibited from being supplied to the gates G1 and G4 of the motor drive circuit 16.

Figure 9:
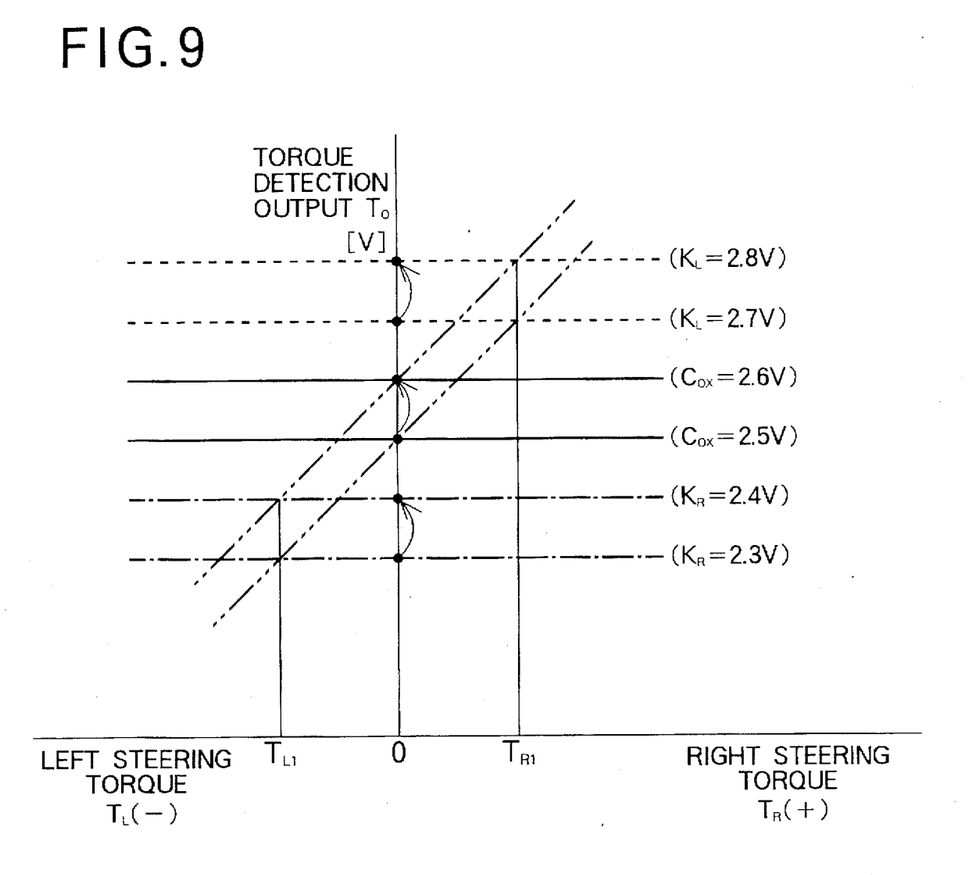
FIG. 9 is a graph showing the manner in which operation reference values in the left and right directions can be compensated for in response to the offset of the center value.

FIG. 9 is a graphical representation of the compensation characteristics of the operating reference values $K_L$ and $K_R$ corresponding to the offset of the center value $C_{OX}$.

As shown in FIG. 9, when the center value $C_{OX}$ is a reference value of 2.5V, reference values of the left and right operating reference values $K_L$ and $K_R$ are set to be 2.7V and 2.3V, respectively.

Under such conditions, when the right steering torque $T_R$ becomes $T_{R1}$, the left operating reference value $K_L$ (2.7V) inhibits the motor control signal $V_O$ (FIG. 2) in the left direction (for driving the electric motor 10 to generate power assist in the left direction) from being output to the motor drive circuit 16. Conversely, when the left steering torque $T_L$ becomes $T_{L1}$, the right operating reference value $K_R$ (2.3V) inhibits the motor control signal $V_O$ in the right direction (for driving the electric motor 10 to generate power assist in the right direction) from being output to the motor drive circuit 16.

The right steering torque $T_{R1}$ and the left steering torque $T_{L1}$ have the same absolute value ( |TR1|=|TL1| ) and rotational directions (polarities) opposite to each other with the result that points at which output of the motor control signals $V_O$ in the left and right directions is inhibited are in a balanced or symmetrical condition with respect to the center value $C_{OX}$.

Even when the center value $C_{OX}$ is varied or offset from 2.5V to, for example, 2.6V due to some reasons, the left and right operating reference values $K_L$ (2.7) and $K_R$ (2.3V) increases by the increment of the center value $C_{OX}$ (+0.1V) to be 2.8V and 2.4V, respectively. Accordingly the motor control signal $V_O$ in the left direction is inhibited from being output to the motor drive circuit 16 when the right steering torque $T_R$ is $T_{R1}$. Similarly, the motor control signal $V_O$ in the right direction is inhibited from being output to the motor drive circuit 16 when the left steering torque $T_L$ is $T_{L1}$. Thus, points of the left and right steering torques at which the motor control signals $V_O$ in the left and right directions are inhibited from being output to the motor drive circuit 16 are always kept in a balanced or symmetrical condition with respect to the center value $C_O$.

Obviously, various minor changes and modifications are possible in the light of the above teaching. It is to be understood that within the scopes of the appended claims the present invention may be practiced otherwise than as specifically described.

What is claimed is:

1. An electric power steering apparatus comprising:

an electric motor for providing an assist torque to a steering system;

a steering torque sensor for detecting a steering torque of said steering system and generating a steering torque signal indicative of the detected steering torque;

a control unit including a target current signal setting device for generating a target current signal on the basis of the steering torque signal, and a motor control circuit for generating a motor control signal on the basis of the target current signal;

a motor drive circuit for driving said electric motor on the basis of the motor control signal;

said control unit further including a center value compensating circuit for compensating for the offset of a center value of said steering torque sensor, and a direction inhibiting circuit for inhibiting, on the basis of the steering torque signal, the motor control signal from being supplied to said motor drive circuit; and said direction inhibiting circuit having a reference value changing section for changing operation reference values in left and right directions of the steering torque in response to the offset of the center value.

2. An electric power steering apparatus according to claim 1, wherein said reference value changing section includes a left voltage pattern setting device having a plurality of left voltage value patterns set in advance for the center value so as to generate one of the left voltage value patterns corresponding to the offset center value, and a right voltage pattern setting device having a plurality of right voltage value patterns set in advance for generating one of the right voltage value patterns corresponding to the offset center value.

3. An electric power steering apparatus according to claim 1, wherein said reference value changing section includes a left operation reference value changing device having a plurality of left operation reference values stored in advance for the center value so as to generate one of the left operation reference values corresponding to the offset center value, and a right operation reference value changing device having a plurality of right operation reference values stored in advance for the center value so as to generate one of the right operation reference values corresponding to the offset center value.

* * * * *